(12) United States Patent
Lin

(10) Patent No.: US 9,804,333 B1
(45) Date of Patent: Oct. 31, 2017

(54) COARSE WAVELENGTH DIVISION MULTIPLEXING DEVICE

(71) Applicant: HON HAI PRECISION INDUSTRY CO., LTD., New Taipei (TW)

(72) Inventor: Po-Yu Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/493,126

(22) Filed: Apr. 20, 2017

(30) Foreign Application Priority Data

Feb. 24, 2017 (TW) .............................. 106106358 A

(51) Int. Cl.
| | | |
|---|---|---|
| *G02B 6/28* | (2006.01) | |
| *G02B 6/293* | (2006.01) | |
| *G02B 6/32* | (2006.01) | |
| *G02B 6/34* | (2006.01) | |
| *G02B 6/42* | (2006.01) | |

(52) U.S. Cl.
CPC ....... *G02B 6/29367* (2013.01); *G02B 6/2938* (2013.01); *G02B 6/32* (2013.01); *G02B 6/34* (2013.01); *G02B 6/425* (2013.01); *G02B 6/4214* (2013.01); *G02B 6/4215* (2013.01); *G02B 6/4244* (2013.01); *G02B 6/4256* (2013.01)

(58) Field of Classification Search
CPC . H04J 14/02; H04Q 11/0005; G02B 6/12007; G02B 6/2938; G02B 6/29395; G02B 6/28
See application file for complete search history.

(56) References Cited

U.S. PATENT DOCUMENTS 7,738,790 B2 *  6/2010  Nozue ................. H04J 14/0282
                                                         398/69
8,440,952 B2 *  5/2013  Jalali .................. A61B 1/00009
                                                         250/208.1

FOREIGN PATENT DOCUMENTS

| CN | 105158853 A | 12/2015 |
|---|---|---|
| TW | 201325109 A1 | 6/2013 |

* cited by examiner

*Primary Examiner* — Jennifer Doan
(74) *Attorney, Agent, or Firm* — Steven Reiss

(57) ABSTRACT

A coarse wavelength division multiplexing (CWDM) device includes a supporting frame, a collimating lens, focusing lenses, a supporting block, and a light splitter. The supporting frame includes first frame portion with collimating lens and a second frame portion with focusing lenses arranged in an array along an extending direction of the second frame portion. The supporting block includes a first sidewall facing the first frame portion and a second sidewall facing the second frame portion. The light splitter includes a mirror on the first sidewall and a plurality of filters on the second sidewall, the filters being arranged in an array along an extending direction of the second sidewall. The filters correspond to the focusing lenses.

10 Claims, 4 Drawing Sheets

COARSE WAVELENGTH DIVISION MULTIPLEXING DEVICE

FIELD

The subject matter herein generally relates to coarse wavelength division multiplexing.

BACKGROUND

Coarse Wavelength Division Multiplexing (CWDM) uses a multiplexer at the transmitter to multiplex a number of optical signals with different wavelengths onto a single optical fiber, and a demultiplexer at the receiver to split them apart.

A CWDM receiver usually comprises a collimator, a number of condensing lenses, and a light splitter. The light splitter comprises an array of filters. Each filter corresponds to one condensing lens. Each filter has a predetermined inclined angle in relation to the incident light which strikes the filter. In operation, a first filter receives incident light collimated by the collimator. Then, the first filter allows the incident light in a particular wavelength band to penetrate towards the corresponding condensing lens and reflects the incident light in other wavelength bands towards the mirror, so that the incident light can be reflected by the mirror towards a second filter. The second filter performs similar actions as the first filter, so that the incident light can finally be split into light of different wavelengths after repeated penetrations and reflections.

However, the filters are independent of each other, so that the CWDM receiver is sensitive to an error in angle of each filter when the filter is assembled, thereby increasing the difficulty for manufacturing the CWDM receiver.

BRIEF DESCRIPTION OF THE DRAWINGS

Implementations of the present technology will now be described, by way of example only, with reference to the attached figures.

DETAILED DESCRIPTION

Figure 1:
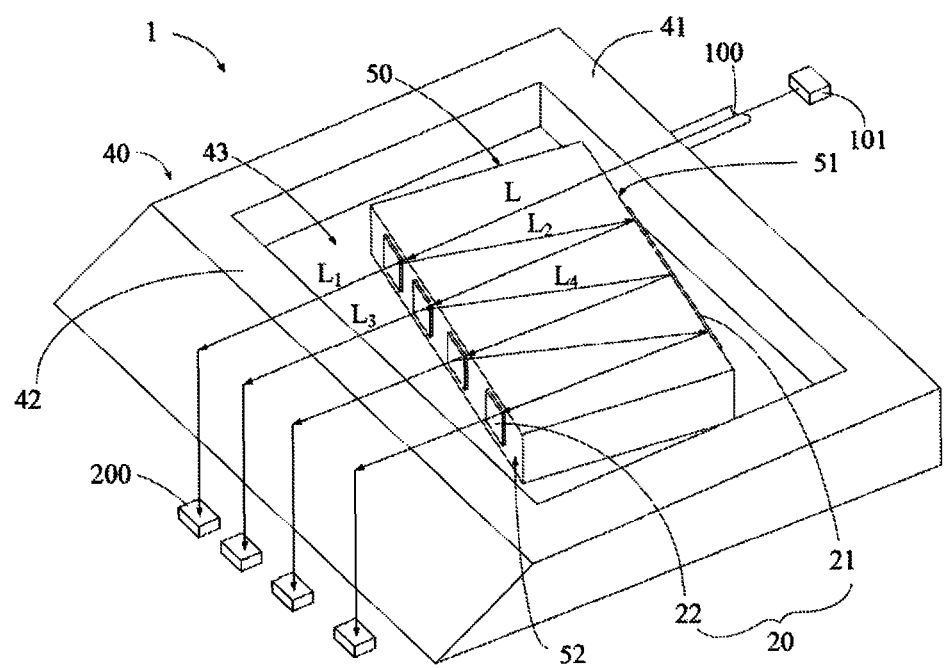
FIG. 1 is a diagrammatic view of an exemplary embodiment of a CWDM device.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Figure 2:
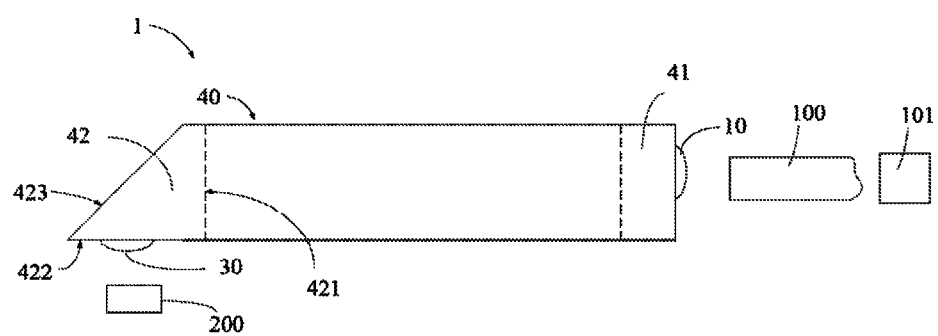
FIG. 2 is similar to FIG. 1, but showing the CWDM device from another angle.
Figure 3:
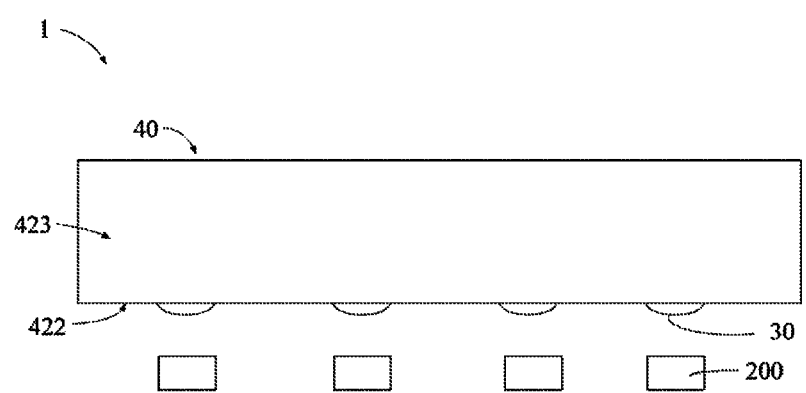
FIG. 3 is similar to FIG. 1, but showing the CWDM device from yet another angle.

FIGS. 1-3 illustrate an exemplary embodiment of a coarse wavelength division multiplexing (CWDM) device 1 functioning as a CWDM receiver. The CWDM 1 comprises a collimating lens 10, a light splitter 20, a number of focusing lenses 30, a supporting frame 40, and a supporting block 50.

The supporting frame 40 is substantially a hollow rectangle, and defines a receiving groove 43 in a center. The supporting frame 40 further comprises a first frame portion 41 and a second frame portion 42 opposite to the first frame portion 41. The second frame portion 42 has a cross section the same as that of an isosceles right triangle. That is, the second frame portion 42 forms a wedge-shaped prism which includes a first surface 421 and a second surface 422 perpendicular to the first surface 421. The first surface 421 faces the first frame portion 41. The second frame portion 42 further comprises an inclined surface 423 which forms an angle of 45 degrees with respect to each of the first and the second surfaces 421, 422. The inclined surface 423 deflects incident light travelling through the first surface 421 by about 90 degrees towards the second surface 422.

The collimating lens 10 is formed on a side of the first frame portion 41 facing away from the second frame portion 42, and is aligned with an optical fiber 100. When the CWDM device 1 functions as a CWDM transmitter, the optical fiber 100 is aligned with a laser diode 101, and transmits the incident light emitted by the laser diode 101 to the collimating lens 10. In at least one exemplary embodiment, the optical fiber 100 is a single-mode optical fiber.

FIG. 3 illustrates that the focusing lenses 30 are formed on the second surface 422 and arranged in an array along an extending direction of the second surface 422. Each focusing lens 30 is aligned with a photodiode 200, and focuses towards one photodiode 200 the incident light which strikes the second surface 422. In at least one exemplary embodiment, the number of the focusing lenses 30 is four, that is, the CWDM device 1 has 1×4 channels.

The supporting block 50 is received in the receiving groove 43 and is substantially rectangular. The supporting block 50 comprises a first sidewall 51 and a second sidewall 52 opposite to the first sidewall 51. The first sidewall 51 faces the first frame portion 41. The second sidewall 52 faces the second frame portion 42.

The light splitter 20 comprises a mirror 21 and a number of filters 22. The mirror 21 is formed on the first sidewall 51. The filters 22 are formed on the second sidewall 52 and arranged in an array along an extending direction of the second sidewall 52. The filters 22 correspond to the focusing lenses 30. The second sidewall 52 is inclined with respect to the first frame portion 41, so that each filter 22 has a predetermined inclined angle in relation to the incident light which strikes the filter 22. As such, the filter 22 can allow penetration of incident light in a particular wavelength band to the corresponding focusing lens 30 and reflect incident light in other wavelength bands towards the mirror 21. The mirror 21 reflects the incident light towards a next filter 22.

Referring to FIG. 1, when the CWDM device 1 functions as a CWDM receiver, the incident light L emitted by the laser diode 101 enters the collimating lens 10 through the optical fiber 100. The collimating lens 10 collimates the incident light towards an outermost filter 22 (hereinafter, "firstmet filter 22"). The firstmet filter 22 allows penetration of the incident light in a particular wavelength band (hereinafter, "incident light $L_1$") towards the inclined surface 423 which then deflects the incident light $L_1$ towards the corresponding focusing lens 30. At the same time, the first filter 22 reflects all other incident light (hereinafter, "incident light $L_2$") towards the mirror 21. The mirror 21 reflects the incident light $L_2$ to a next filter 22 (hereinafter, "secondmet filter 22"). The secondmet filter 22 allows penetration of the incident light in a particular wavelength band (hereinafter, "incident light $L_3$") inclined surface 423 which then deflects the incident light $L_3$ about 90 degrees towards the corresponding focusing lens 30. At the same time, the second filter 22 reflects the other incident light (hereinafter, "incident light $L_4$") towards the mirror 21. The mirror 21 reflects the incident light $L_4$ to the next filter 22. After repeated penetrations and reflections, the incident light L can be separated into a number of beams of light, each with a different wavelength.

Figure 4:
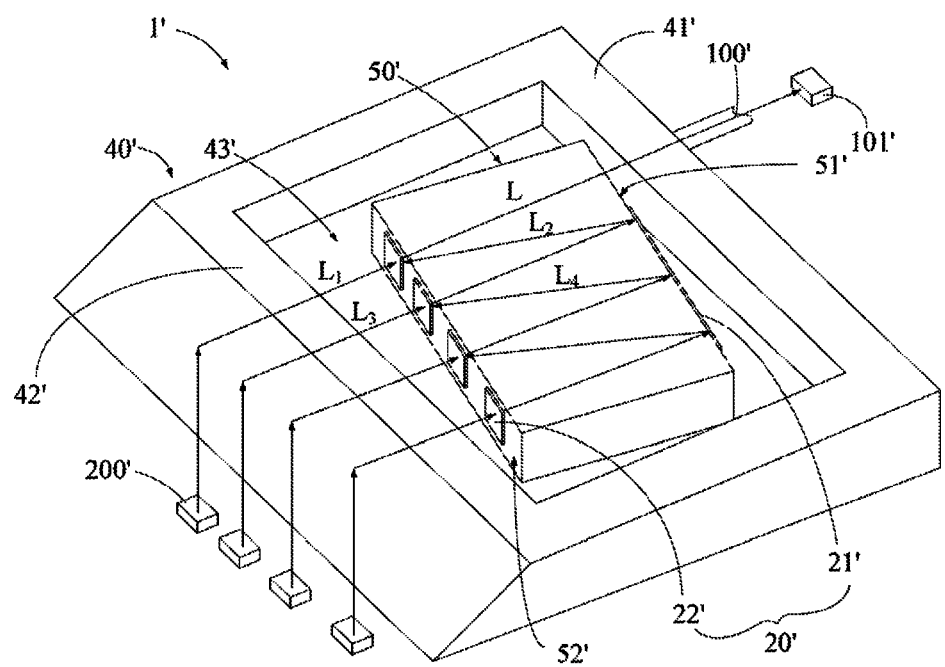
FIG. 4 is a diagrammatic view of another exemplary embodiment of a CWDM device.

FIG. 4 illustrates another exemplary embodiment of a CWDM device 1' functioning as a CWDM transmitter. Difference between the CWDM device 1' and the CWDM device 1 is that the focusing lenses 30' are aligned with laser diodes 200'. The optical fiber 100 is aligned with a photodiode 101'. The filters 22 allow penetration of the incident light towards the mirror 21. The mirror 21 reflects the incident light towards the corresponding filter 22, so that the filter 22 can reflect the incident light towards the mirror 21 again.

When the CWDM device 1' functions as a CWDM transmitter, the incident light $L_1$, $L_2$, $L_3$, and $L_4$ emitted by the laser diodes 200' enters the focusing lenses 30' and the focusing lenses 30' focus the incident light $L_1$, $L_2$, $L_3$, and $L_4$ towards the inclined surface 423'. The inclined surface 423' deflects the incident light $L_1$ by about 90 degrees towards the filters 22'. The filters 22' allow penetration of the incident light $L_1$ toward the optical fiber 100' and the incident light $L_2$, $L_3$, and $L_4$ towards the mirror 21'. The mirror 21' reflects the incident light $L_2$, $L_3$, and $L_4$ to the corresponding filters 22'. The filters 22' reflect the incident light $L_2$, $L_3$, and $L_4$ until the separated incident light $L_1$, $L_2$, $L_3$, and $L_4$ are combined into a single beam of light to the optical fiber 100'.

With the above configuration, the filters 22 are formed on the second sidewall 52 of the supporting block 50, so that each filter 22 can have a predetermined inclined angle in relation to the incident light which strikes the filter 22 when the second sidewall 52 is inclined with respect to the first frame portion 41. The sensitivity of the CWDM device 1 to an error in angle of each filter 22 is thereby decreased. Furthermore, the filters 22 and the mirror 21 are combined through the supporting block 50, thereby avoiding an error in position and angle when the filters 22 and the mirror 21 are assembled. This also ensures that the filters 22 and the mirror 21 can have a same inclined angle. Moreover, the collimating lens 10 and the focusing lenses 30 are combined through the supporting frame 40, thereby avoiding a position error and an angle error when the collimating lens 10 and the focusing lenses 30 are assembled and further decreasing the sensitivity of the CWDM 1 to the error in angle of the collimating lens 10 and each focusing lens 30. Finally, the mirror 21 can reflect the incident light towards the corresponding filter 22, so that the incident light can travel along a nonlinear path. Thus, the transmission distance of the incident light is decreased, allowing smaller size of the CWDM device 1.

In at least one exemplary embodiment, the first sidewall 51 and the second sidewall 52 are parallel, so that each filter 22 and the mirror 21 are parallel.

In at least one exemplary embodiment, the supporting frame 40 and the supporting block 50 are made of transparent material (such as glass or crystal) to allow the incident light to pass through.

In at least one exemplary embodiment, the filters 22 are low-cost edge filters.

Even though information and advantages of the present exemplary embodiments have been set forth in the foregoing description, together with details of the structures and functions of the present exemplary embodiments, the disclosure is illustrative only. Changes may be made in detail, especially in matters of shape, size, and arrangement of parts within the principles of the present exemplary embodiments, to the full extent indicated by the plain meaning of the terms in which the appended claims are expressed.

What is claimed is:

1. A coarse wavelength division multiplexing device comprising:
    a supporting frame defining a receiving groove, and comprising first frame portion and a second frame portion opposite to the first frame portion;
    a collimating lens formed on a side of the first frame portion facing away from the second frame portion;
    a plurality of focusing lenses formed on the second frame portion and arranged in an array along an extending direction of the second frame portion;
    a supporting block received in the receiving groove, and comprising a first sidewall and a second sidewall opposite to the first sidewall, the first sidewall facing the first frame portion, and the second sidewall facing the second frame portion; and
    a light splitter comprising a mirror and a plurality of filters, the mirror formed on the first sidewall, the plurality of filters formed on the second sidewall and arranged in an array along an extending direction of the second sidewall, the plurality of filters corresponding to the plurality of focusing lenses;
    wherein each of the plurality of filters has a predetermined inclined angle in relation to incident light which strikes the plurality of filters.

2. The coarse wavelength division multiplexing device of claim 1, wherein the second frame portion forms a wedge-shaped prism which comprises a first surface and a second surface perpendicular to the first surface, the first surface faces the first frame portion, the second frame portion further comprises an inclined surface which forms an angle of 45 degrees with respect to each of the first and the second surfaces, the plurality of focusing lenses are formed on the second surface and arranged in an array along an extending direction of the second surface.

3. The coarse wavelength division multiplexing device of claim 1, wherein the second sidewall is inclined with respect to the first frame portion, so that each of the plurality of filters has the predetermined inclined angle in relation to the incident light which strikes the plurality of filters.

4. The coarse wavelength division multiplexing device of claim 1, wherein the first sidewall and the second sidewall are parallel, so that each of the plurality of filters and the mirror are parallel.

5. The coarse wavelength division multiplexing device of claim 1, wherein the supporting frame and the supporting block are made of transparent material.

6. The coarse wavelength division multiplexing device of claim 5, wherein the supporting frame and the supporting block are made of glass.

7. The coarse wavelength division multiplexing device of claim 5, wherein the supporting frame and the supporting block are made of crystal.

8. The coarse wavelength division multiplexing device of claim 1, wherein each of the plurality of filters is an edge filter.

9. The coarse wavelength division multiplexing device of claim 1, having 1×4 channels.

10. The coarse wavelength division multiplexing device of claim 1, wherein the supporting block is rectangular.

* * * * *